UNITED STATES PATENT OFFICE.

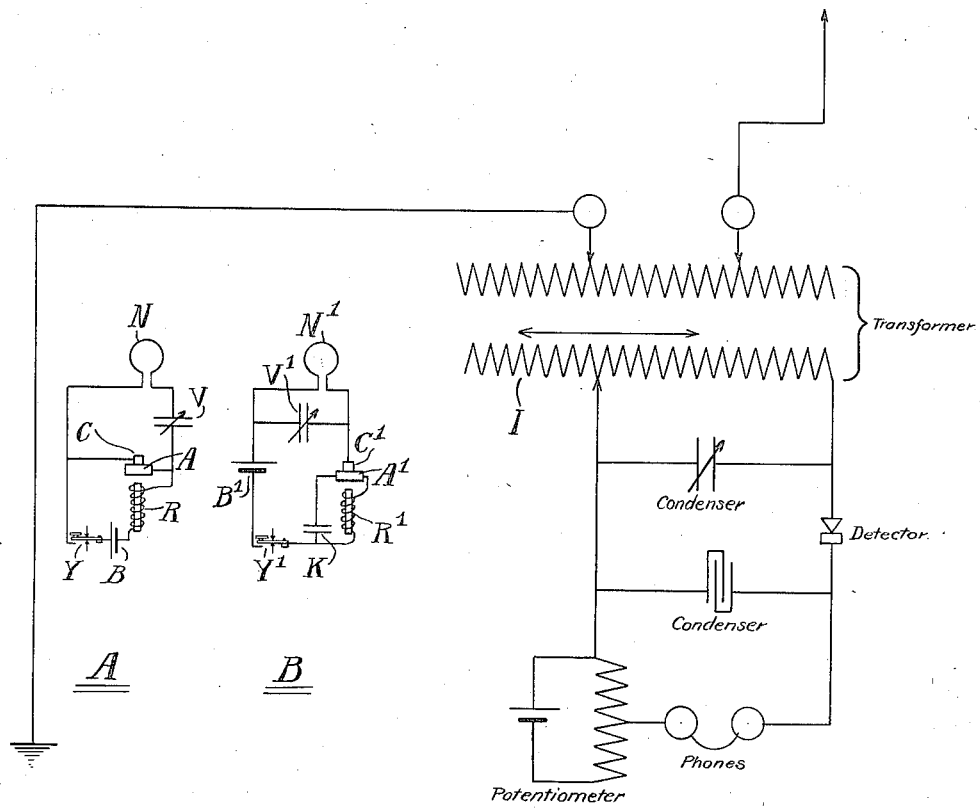

GREENLEAF WHITTIER PICKARD, OF AMESBURY, MASSACHUSETTS, ASSIGNOR TO WIRELESS SPECIALTY APPARATUS COMPANY, OF BOSTON, MASSACHUSETTS, A CORPORATION OF NEW YORK.

APPARATUS FOR RADIO COMMUNICATION.

1,176,925.  Specification of Letters Patent.  Patented Mar. 28, 1916.

Application filed January 15, 1913. Serial No. 742,101.

*To all whom it may concern:*

Be it known that I, GREENLEAF WHITTIER PICKARD, a citizen of the United States of America, and a resident of Amesbury, Massachusetts, have invented certain new and useful Improvements in Apparatus for Radio Communication, the principles of which are set forth in the following specification and accompanying drawing, which disclose the form of the invention which I now consider to be the best of the various forms in which the principles of the invention may be embodied.

This invention relates to improvements in apparatus for radio communication, and consists of the combination and arrangement of the circuits and apparatus herein disclosed, with more particular reference to the testing set used with the receiving apparatus for the purpose of enabling an operator to determine and preserve the operative condition of his receiving apparatus.

The object of the invention is to obtain a testing outfit or set which will function accurately, the lack of such functioning having been a fault in prior sets.

The drawing is a diagrammatic illustration of two embodiments of the invention, A and B.

As is well known, the function of the test set is to produce a local disturbance which shall have an effect on the receiving apparatus which shall be comparable as nearly as possible to the effect on the receiving apparatus of signals transmitted from a distant sender with which it is desired to maintain communication. If such function of the test set is efficiently executed, the operator may be assured, substantially, that his receiving apparatus is in effective working condition, and specifically that it is in the best possible condition for working with a distant sender having known characteristics, although this has not been possible heretofore.

One of the principal faults in the previous test sets has been that they do not produce in the receiving circuit, oscillations of the same character as those resulting from radio communications from a distant sending station. That is to say, when prior test sets are used, an adjustment of the receiving apparatus and detector, which gives the maximum response, as in the head-telephones, to the local disturbances in the test set, is not the best adjustment for signals from a distant sending station; all this being irrespective of the wave-length or tuning. In short, a good adjustment for the test set signals has been a poor adjustment for distant radiations, and a good adjustment for distant radiations has not given a maximum response to the test signals. The reasons for such defect of prior test sets have not been fully investigated or determined, but the apparatus and arrangement herein disclosed I have discovered to be highly advantageous in substantially eliminating the defects above referred to, and in providing certain important additional advantages.

In the drawing, I indicates an inductance (as the secondary of the oscillation transformer), belonging to any suitable receiving circuit, which inductance may not only be adjustable as to the number of turns in circuit (as indicated by the single arrow on the wire), but is bodily movable or adjustable relative to loops N or $N^1$, as in the directions indicated by the double arrows above the coils, i. e., to and from the loops or coils N or $N^1$ of the test set. This relative movement of the inductances of the receiving circuit and of the test circuit respectively, may be any translational or angular movement which will vary the mutual inductance of these circuits.

Either of the test sets A or B may be employed, and they are both shown in the single drawing here for convenience. The coil of the test set, N or $N^1$, is preferably located a considerable distance, as about a foot, from the receiving circuit inductance I, in its average or normal position, for the reason that it is usually best, in long distance signaling, to adjust the receiving apparatus and the detector to feeble impulses corresponding with those received from far distant sending apparatus. The coils N or N¹ may consist of only a single turn of wire, as shown.

The operation of test set A is as follows: The closing of switch or key Y causes current from battery B to flow through the buzzer-winding R, the movable buzzer armature A and the stationary contact C, back to the battery by way of key Y; this energizes the buzzer magnet and causes movement of armature A and consequent breaking of the circuit at A, C. Forthwith, at the instant of occurrence of the break, an electromotive force occurs across C, A which charges variable condenser V. Immediately after this the contacts A, C again close, whereupon charged condenser V discharges through the closed circuit N, A, C, and sets up oscillations in that circuit, the period or wave-length of which depend solely upon the capacity of condenser V and the inductance of loop N. This frequency, by adjustment of condenser V (or change in inductance of loop N, or both) may be made of any desired value, preferably that to which the receiving circuit is adjusted or at which it is generally used. The operator, repeatedly working the test set by key Y, also varies the adjustment of the detector itself until a response of maximum intensity is observed in the usual telephone receivers or their equivalents in the receiving apparatus.

Embodiment B is the same as A save for a change in the connections of A, C and V, and for the use of an additional condenser K. As in A, oscillations are set up in oscillation circuit N¹, V¹ by the electrical impulses resulting from the action of the make-and-break at C¹, A¹. Here, however, A, C is directly in series with both the battery B¹ and inductance N¹; and the branch connection includes variable condenser V¹ so that a charge in the oscillating circuit N¹, V¹ is free to continue to oscillate, while the battery circuit is open at C¹, A¹, irrespective of other conditions at A¹, C¹ or any of the rest of the apparatus. This differs from embodiment A, wherein the oscillating circuit N, V is closed only by way of A, C.

The other difference from embodiment A which may be included in embodiment B, is the useful employment of the extra condenser K of relatively large capacity, connected as shown. This acts solely as a shunt to buzzer-coil R¹, and its function is to make the circuit N¹, C¹, A¹, K, Y¹, B¹ of small impedance to an abrupt current change, so that when contacts C¹, A¹ separate from each other, a very sharp impulse is given to circuit N¹, V¹.

Embodiment B is preferable to A in that it constitutes a more efficient circuit, probably because a larger current flows through the oscillation circuit. But since efficiency in such respect is not so important as exact reproduction of effect of distant radiations, there is little choice between embodiments A and B.

The following advantages inhere in both embodiments A and B. The test set produces and imparts to the receiving and detector circuits, oscillations of any desired and definite frequency or wave-length, which frequency may be and preferably is the same as that of the commercial waves radiated from a distant sender. The receiving circuit is inductively coupled (I, N or I, N¹) and tuned (arrow in circuit at I), to the buzzer circuit, or the latter circuit to the former (variable condensers V or V¹). The adjustment of the receiving circuits and detector which gives the maximum response to the operation of the test set, is, for the first time, in this invention, the same adjustment which will give the maximum response to waves transmitted from a distant station. The adjustment (bodily movement) of the receiving-circuit-inductance I permits a variation over wide limits of the intensity of the test signals as effective on the telephones, while yet utilizing what is the normal adjustment of inductance I for other purposes, including that of coupling-variation between the primary and secondary of the oscillation transformer of the receiving apparatus. In short, all the essential conditions of signaling over varying distances of great length may be by this invention operatively duplicated in respect of the test set.

I claim:—

1. A testing apparatus for a receiver for radio communication, which comprises an oscillating circuit and means for producing electrical oscillations therein, said means including an electromagnetically operated make-and-break device, and a condenser of large capacity connected in shunt to the coil of said device, to permit the giving of a sharp impulse to said oscillating circuit by the make-and-break device.

2. In the art of radio communication, the combination with a tuning inductance of a receiving apparatus, constituting the secondary of the oscillation transformer, which inductance is adjustable as to the number of its turns in the receiving circuit whereby it may be tuned to the wave-frequency of a spark from a distant transmitter, of a testing apparatus in proximity to said tuning inductance and comprising an oscillating circuit, and means for producing electrical oscillations therein, said oscillatory circuit including lumped inductance and capacity, and being adjustable as to its periodicity, whereby the latter may be made to correspond with the wave-frequency of a distant transmitter and also to the period to which the receiver is tuned by the adjustability of said tuning inductance; said lumped inductance being located in a permanently stationary position at a considerable distance from said tuning inductance, and in inductive relation therewith, the latter being independently movable to and from said lumped inductance, whereby the intensity of the signals from the testing apparatus, in addition to their frequency, may be made to correspond with that of the signals from the distant transmitter.

GREENLEAF WHITTIER PICKARD.

In presence of—
W. H. SEABURY,
N. GENTLEMAN.